United States Patent
Gleis

(10) Patent No.: US 6,615,094 B2
(45) Date of Patent: Sep. 2, 2003

(54) METHOD FOR PROVIDING MANUFACTURING-RELATED DATA IN LARGE-SCALE PRODUCTION OF MANUFACTURED OBJECTS, ESPECIALLY AUTOMOBILES

(76) Inventor: Stefan Gleis, Eichstrasse 43, D-30161 Hannover (DE)

( * ) Notice: Subject to any disclaimer, the term of this patent is extended or adjusted under 35 U.S.C. 154(b) by 246 days.

(21) Appl. No.: 09/733,966

(22) Filed: Dec. 12, 2000

(65) Prior Publication Data

US 2001/0004089 A1 Jun. 21, 2001

Related U.S. Application Data

(63) Continuation of application No. PCT/EP99/04198, filed on Jun. 17, 1999.

(30) Foreign Application Priority Data

Jul. 1, 1998 (DE) .......................................... 198 29 366

(51) Int. Cl.[7] .............................................. G06F 19/00
(52) U.S. Cl. .......................... 700/108; 700/95; 700/110; 700/116
(58) Field of Search .................... 700/95–96, 108–112, 700/115–116; 702/182–186

(56) References Cited

U.S. PATENT DOCUMENTS

| | | | | |
|---|---|---|---|---|
| 4,683,540 A | * | 7/1987 | Kurosu et al. ............... | 700/116 |
| 5,088,045 A | * | 2/1992 | Shimanaka et al. .......... | 700/110 |
| 5,150,288 A | * | 9/1992 | Imai et al. ................... | 700/116 |
| 5,341,304 A | * | 8/1994 | Sakamoto et al. ........... | 700/110 |
| 5,493,501 A | * | 2/1996 | Kondo ........................ | 700/95 |
| 5,796,351 A | | 8/1998 | Yabuki | |

FOREIGN PATENT DOCUMENTS

| | | |
|---|---|---|
| DE | 41 13 556 | 10/1991 |
| DE | 691 02 882 | 3/1995 |
| DE | 198 29 366 | 1/2000 |
| GB | 2 239 723 | 7/1991 |
| GB | 2 279 775 | 1/1995 |

OTHER PUBLICATIONS

"*Identifikationssystem: Das Plus für jede SPS*", 2087 Elektronik, 43 (1994) Apr., 5, No. 7, München, DE, Elektronik Jul. 1994 pp. 74–82, ISSN 0013–5668.
Patent Abstracts of Japan, JP 61108079, published May 26, 1986, application No. 59226685, filed Oct. 30, 1984; "Quality Control System for Car", inventor Akiyama Yutaka, 1 page.

\* cited by examiner

*Primary Examiner*—Leo Picard
*Assistant Examiner*—Walter R. Swindell
(74) *Attorney, Agent, or Firm*—Shlesinger, Arkwright & Garvey LLP

(57) ABSTRACT

Method for providing manufacturing-related data in the large-scale production of manufactured objects, in particular, automobiles, includes a data collecting device assigned to each manufactured object, with manufacturing-related data being input into the data collecting device at least in a part of the manufacturing sections of the large-scale production, and with the data being transmitted at least partially by the corresponding data collecting device to one central device during manufacturing. Manufacturing-related data consequently are made centrally available in the central device and can be used for planning possibly required subsequent work. The planning of subsequent work consequently can be carried out when the manufactured object is still located in the manufacturing process. This considerably simplifies the planning of subsequent work and makes it possible to save time and lower costs.

32 Claims, 2 Drawing Sheets

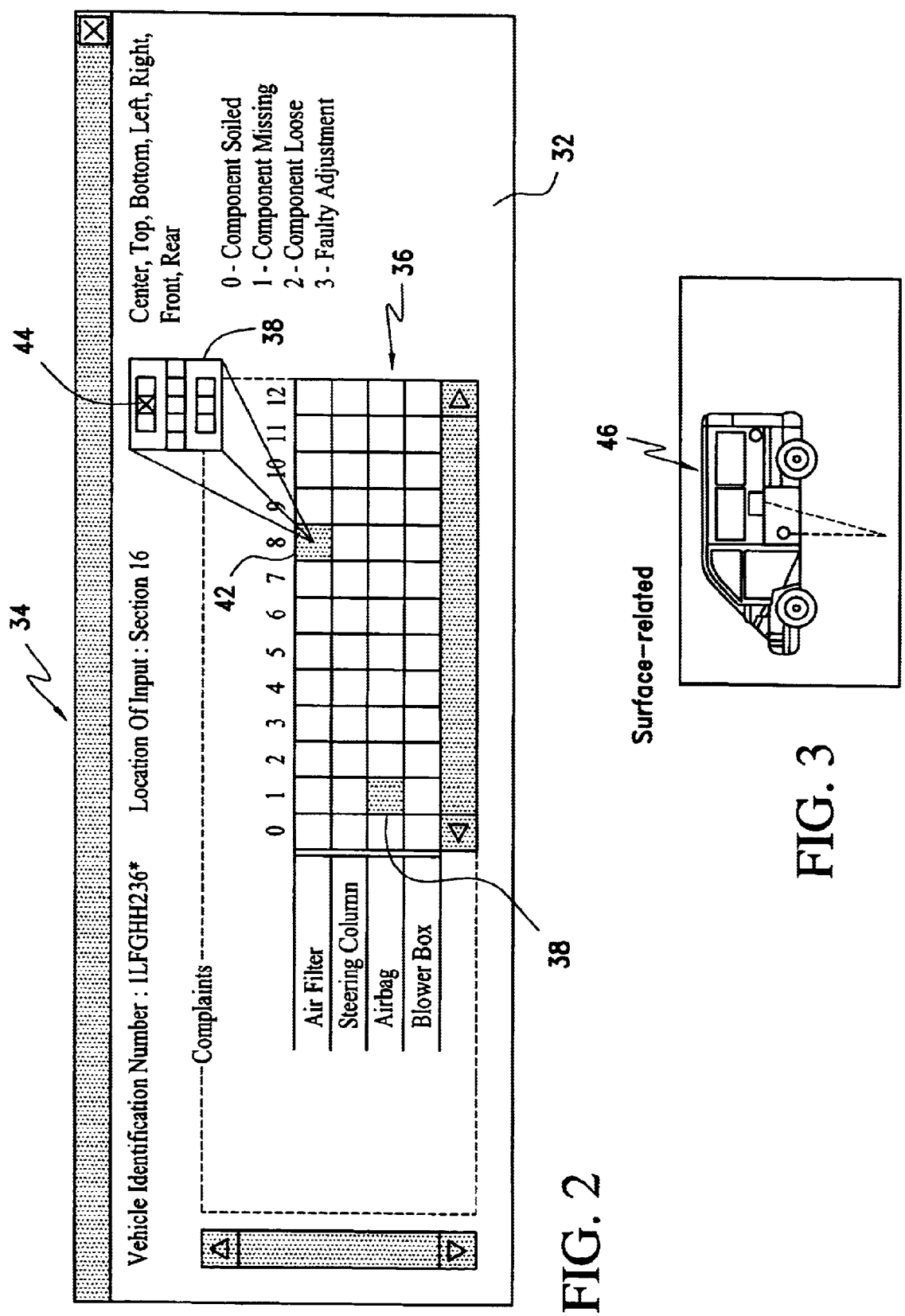

METHOD FOR PROVIDING MANUFACTURING-RELATED DATA IN LARGE-SCALE PRODUCTION OF MANUFACTURED OBJECTS, ESPECIALLY AUTOMOBILES

CROSS REFERENCE TO RELATED APPLICATIONS

This application is a continuation of PCT/EP99/04198, filed Jun. 17, 1999, which claims the priority of German Application No. 198 29 366.6, filed Jul. 1, 1998, and each of which is incorporated in by reference.

FIELD OF THE INVENTION

The invention pertains to a method for providing manufacturing-related data in the large-scale production of manufactured objects, in particular, automobiles.

BACKGROUND OF THE INVENTION

In the large-scale production of automobiles, it is common practice to assign a so-called accompanying card to each automobile. This card accompanies the automobile while it passes through manufacturing sections, e.g., while the automobile passes through different preassembly and assembly sections, and is assigned to this automobile. Complaints of the workers who are active in these manufacturing sections are registered on this accompanying card in the various manufacturing sections. These complaints may, for example, pertain to defects of the components or groups of components used in the large-scale production. For example, a reference on the accompanying card may indicate that a certain component, e.g., an air filter, is damaged or contains another defect, e.g., the air filter is soiled. This also applies to groups of components, e.g., auxiliary heating systems or air conditioning systems. The accompanying card may also contain a reference to missing components if a component required in a certain manufacturing section is unavailable.

After passing through the various manufacturing sections of the large-scale production, the accompanying card is removed from the automobile such that a list of complaints pertaining to this automobile is available and the required subsequent work can be planned and initiated based on the references on the accompanying card, e.g., the replacement of defective components, the installation of missing components or other subsequent improvements. After the subsequent work is carried out, the accompanying card is archived for a certain duration.

One disadvantage of this known method can be seen in the fact that the registration of complaints on the accompanying card is complicated, laborious and susceptible to errors since the accompanying card is quite extensive due to the large quantity of components used in large-scale production, in particular, of automobiles. For example, this accompanying card may consist of several DIN A4 sheets such that the registration of the respective complaint is relatively difficult, in particular, under time pressure.

Another disadvantage of this known method is that the complaints of the workers which are registered on the accompanying card are not available for planning the subsequent work if the accompanying card is used otherwise, e.g., if a worker is currently registering complaints on the accompanying card. This is the reason why certain check points are provided during the manufacturing process in accordance with this known method. The accompanying card is removed at these check points and the required subsequent work can be planned in accordance with the complaints of the workers registered on the accompanying card. This means that the manufacturing-related data for planning the subsequent work are only available at these check points. This is not practical and complicates the planning of subsequent work.

A method for providing manufacturing-related data in the large-scale production of automobiles is known from "Patent Abstracts of Japan," No. 61108079 and from DE 41 13 556 A1 which refers to the previously mentioned publication. In this method, a movable communication device that accompanies the automobile during the manufacturing process is assigned to each automobile.

A similar method is known from GB 2 279 775 A.

OBJECTS AND SUMMARY OF THE INVENTION

The present invention is based on the objective of disclosing a method of the initially mentioned type which does not exhibit the disadvantages of the known method, i.e., a method, in which the collecting and providing of manufacturing-related data is simplified.

Instead of using an accompanying card of paper, the invention proposes a data collecting device that is assigned to the manufactured object, e.g., an automobile, analogous to the accompanying card in the known method described above. Workers are able to enter manufacturing-related data in the form of complaints into the data collecting device in the various manufacturing sections if a defect is detected in the respective manufacturing section. The data may, for example, be input by means of a keyboard or a touchscreen of the data collecting device.

The invention also proposes that the data be at least partially transmitted from the data collecting device to at least one central device during manufacturing. This may, for example, be realized by means of a radio transmission.

This means that the manufacturing-related data are centrally available in the central device and can be used for planning the required subsequent work.

Since the data are, according to the invention, already available in the central device during the manufacturing process, it is no longer necessary to wait until a manufactured object has passed through the entire manufacturing process. The planning of subsequent work consequently may take place while the manufactured object is still located in the manufacturing process. This significantly simplifies the planning of subsequent work and makes it possible to save time and lower costs.

The method according to the invention is particularly suitable for the large-scale production of automobiles. However, it may also be used in the large-scale production of any other manufactured object, e.g., in the manufacture of electronic devices. Consequently, the method according to the invention can be universally utilized.

The data collecting device can have a simple design, e.g., in the form of a simple hand-held computer. Since computers of this type are durable and robust, they can be used over an extended period of time. This has advantageous effects with respect to cost. Another advantage of the method according to the invention can be seen in the fact that the manufacturing-related data can be stored and archived in the central device in the form of electronic data. Consequently, all processes associated with the archiving of the accompanying card in the known method can be executed in a program-controlled fashion. This results in additional time savings and consequently cost reductions.

According to one practical additional development of the method according to the invention, the data collecting device is assigned to the respective manufactured object at the beginning of a first predetermined manufacturing section, with the data collecting device remaining assigned to the respective manufactured object up to a second predetermined manufacturing section. Due to this measure, a fixed allocation of the data collecting device to the respective manufactured object is ensured between the first and the second predetermined manufacturing section, so that the respective manufactured object can be identified by identifying the corresponding data collecting device.

The first and the second manufacturing sections can be chosen in accordance with the respective requirements. However, it is practical if the first manufacturing section is, viewed in the moving direction of the manufactured object through the manufacturing sections, located in one of the first manufacturing sections, with the second manufacturing section being located in one of the last manufacturing sections. For example, if the large-scale production of automobiles comprises the manufacturing sections press, body structure, paint shop, various preassembly sections, various assembly sections, quality assurance and final inspection, the first manufacturing section may be the preassembly and the second manufacturing section may be the final inspection. In this case, the data collecting device is assigned to the automobile after departure from the paint shop, with this allocation being maintained up to the final inspection.

Another embodiment contains means which determine the respectively instantaneous position of the respective data collecting device and the respective manufactured object in the large-scale production, with data that represent the respectively determined instantaneous position of the respective data collecting device and the respective manufactured object being at least occasionally transmitted to the central device. Due to this measure, a certain manufactured object can be located within the manufacturing sections at any time from the central device.

One additional development of the aforementioned embodiment proposes that the means which determine the respectively instantaneous position of the respective data collecting device and the respective manufactured object contain several reception devices that are stationarily arranged and spaced apart from one another within the region of the manufacturing sections. In this case, each data collecting device at least occasionally transmits a log-on signal that is received by different stationary reception devices in a chronologically successive fashion during the passage through the manufacturing sections, namely in such a way that the instantaneous position of the respective data collecting device and the respective manufacturing object can be determined by ascertaining which of the stationary reception devices currently receives the log-on signal from the respective data collecting device. In this embodiment, each data collecting device notifies the stationary reception devices of its arrival similar to a "roaming method." This makes it possible to easily and reliably determine the instantaneous location of a manufactured object with the assigned data collecting device.

According to another additional development, data which contain a code for a identifying the manufactured object and/or the data collecting device, from which the data originate, are transmitted together with the manufacturing-related data or separately therefrom.

According to another additional development, the manufacturing-related data contain a code for identifying the manufacturing section, in which these data are input, and/or a code for identifying a worker who is active in this manufacturing section and/or a code for identifying a group of workers who are active in this manufacturing section. Due to this measure, it is possible to determine which worker or which group of workers has installed and, if applicable, registered a complaint regarding a component or a group of components.

The manufacturing-related data can be transmitted from the data collecting device to the central device or each central device by wire or by wireless means, in particular, via radio or infrared radiation. With wired transmission, electric transmission lines may, for example, be provided on an assembly line, with the data collecting device being connected to the electric transmission lines by means of, for example, a plug connection. A wireless transmission, in particular, via radio, is simple, uncomplicated and not susceptible to interference.

It is practical that the manufacturing-related data be transmitted during the passage through the manufacturing sections. This means that the data transmission takes place simultaneously with the passage through the manufacturing sections. According to another additional development of the method according to the invention, the data are transmitted to the central device immediately after their input into the data collecting device. This means that the data are available in the central device shortly after they are collected.

According to one embodiment of the invention, the data that belong to a manufactured object and/or a manufacturing section are transmitted to the central device in a chronological correlation to the departure of the manufactured object from this manufacturing section, in particular, during or shortly after the departure from the manufacturing section. Due to this measure, a data transmission always takes place when a manufacturing section is completed. This simplifies the planning of subsequent work, in particular, if several subsequent work procedures that are correlated to one another and pertain to the same manufacturing section need to be carried out.

According to another embodiment, the data are transmitted to the central device upon request. In this embodiment, the central device determines the time, at which the data transmission takes place.

According to another embodiment, a holding arrangement for the data collecting device is provided on the manufactured object or in its immediate vicinity, with the transmission of data being initiated by depositing the respective data collecting device in the assigned holding arrangement. This holding arrangement may be realized similar to a docking station, with the data transmission respectively being initiated once the data collecting device is deposited into the docking station.

The manufacturing-related data may, for example, consist of data that contain arbitrary information on the status of the manufactured object and/or components used. For example, the data may contain information which indicates that a certain component or a certain group of components was installed in a functional and flawless condition. However, it is preferred that the manufacturing-related data consists of data that represent the presence of a defect on a component and/or the type and/or the location of a defect on the component and/or the location of a defect on the manufactured object and/or a missing component. In this embodiment, manufacturing-related data are only input into the data collecting device and transmitted if a defect has occurred. If no defect has occurred, no data are input and transmitted. This reduces the quantity of data to be input and transmitted and consequently saves time.

The data collecting device may be realized arbitrarily in accordance with the respective requirements. For example, the data can be input into the data collecting device by means of a keyboard or a keypad.

According to one particularly practical additional development, the data are input into the data collecting device by means of a touchscreen. This simplifies the data input and saves time because it is, in principle, no longer necessary to use a keyboard or a keypad.

According to another additional development, the data can be input into the data collecting device by means of a scanner for scanning a barcode. This type of data input is particularly fast and uncomplicated; however, this method requires that the worker who inputs the data is provided with a corresponding barcode for scanning.

It is practical that the data collecting device contain a display device for monitoring and/or controlling the data input. Due to this measure, it is possible to visually control the data input such that the risk of input errors is reduced.

In another advantageous additional development, at least one input menu is illustrated on the display device or the touchscreen, with the data input being realized by selecting one element or several elements from the input menu. This means that the data input takes place in a menu-controlled fashion in this embodiment, i.e., the input is simplified and the time required for the input is reduced.

In one particularly advantageous additional development of the previously described embodiments, an input menu is illustrated on the display device or the touchscreen in each manufacturing section, namely in accordance with the respective components used in this manufacturing section. In this case, only the components which are required in this particular manufacturing section are displayed in the respective input menu. This additionally simplifies the data input and reduces the risk of input errors.

It would, in principle, suffice to plan any required subsequent work based on the data available in the central device. However, a particularly advantageous additional development proposes that data which originate from different manufactured objects are evaluated in the central device, and that defect data are generated after the evaluation which contains information on the presence of defects on components and/or groups of components used in the large-scale production, with the defect data being transmitted by the central device to the manufacturing sections, in which the respective component and/or groups of components are manufactured and/or prepared and/or made available. Due to this measure, a return message is immediately transmitted to the *j sections, from which defective components or groups of components originate. Corresponding measures for eliminating and avoiding the respective defect can be taken in these sections. The evaluation may take place arbitrarily in accordance with the respective requirements. For example, a statistic evaluation may be carried out which always generates a return message if a certain quantity of defects has occurred or if defects have occurred in a certain a sequence.

According to one embodiment, an assembly line is used in the large-scale production, with the different manufacturing sections being formed by the regions of the assembly line which lie successively viewed in the moving direction of the manufactured objects.

It is preferred that the data collecting devices consist of computer-assisted data collecting devices.

BRIEF DESCRIPTION OF THE DRAWINGS

The invention is described in greater detail below with reference to the enclosed figures. The figures show:

FIG. 2, a menu that is illustrated on the touchscreen of a data collecting device in order to elucidate a menu-controlled data input; and FIG. 3, a schematic automobile on a touchscreen of a data collecting device which serves for identifying paint damage on the automobile, to which the respective data collecting device is assigned.

DETAILED DESCRIPTION OF THE INVENTION

Figure 1:
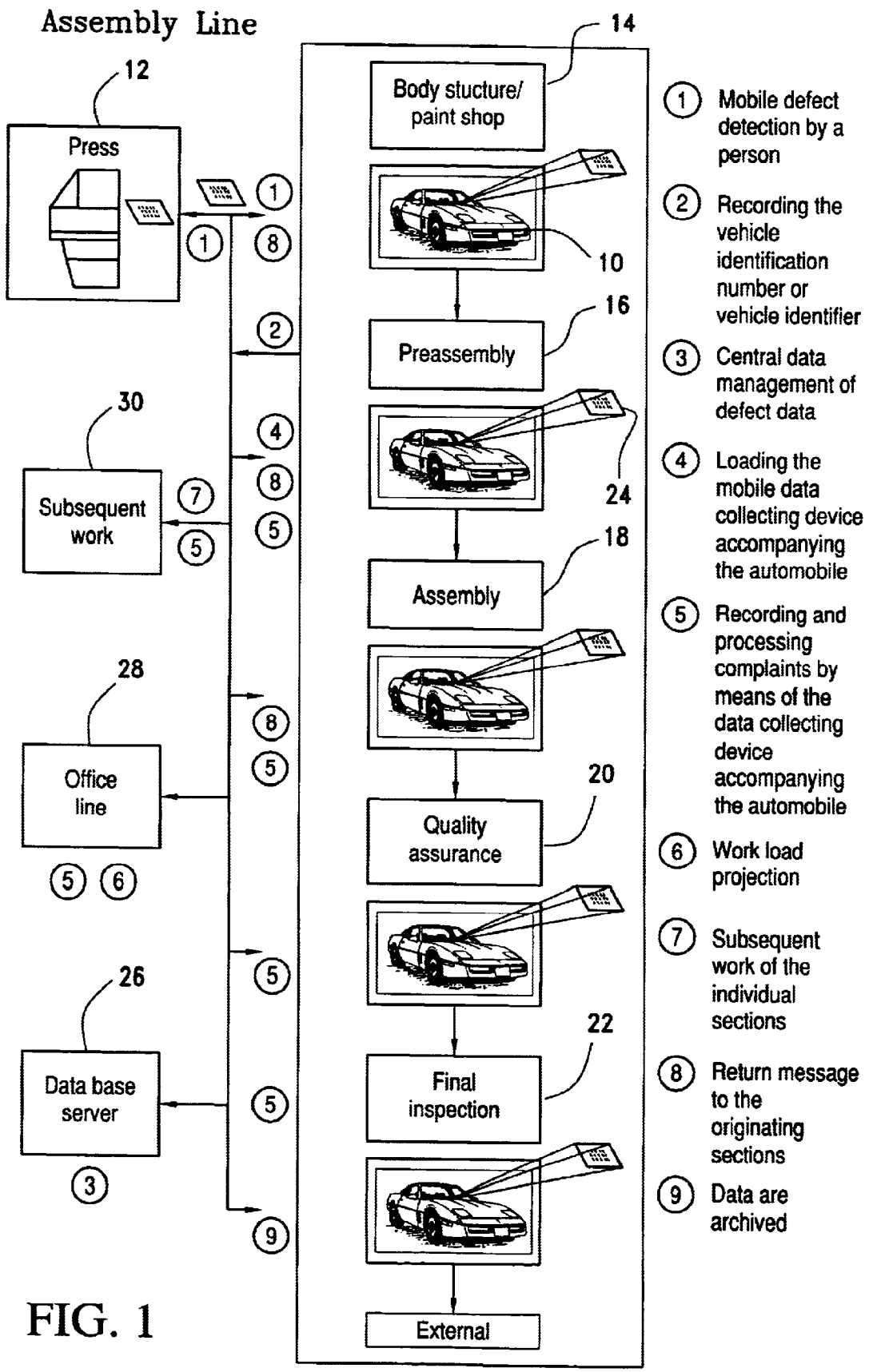
FIG. 1, a schematic representation of the sequence of a manufacturing process in the manufacture of automobiles, in which the method according to the invention is used.

FIG. 1 schematically shows the sequence of the large-scale production of manufactured objects that consist of automobiles 10; In this case, the manufactured objects pass through various manufacturing sections which consist of the manufacturing sections 12 (press), 14 (body structure, paint shop), 16 (preassembly), 18 (assembly), 20 (quality assurance) and 22 (final inspection). In this case,.each of these manufacturing sections, in particular, the manufacturing sections 16 (preassembly) and 18 (assembly), may be divided into additional manufacturing sections. The manufacture of the automobiles 10 takes place in the manufacturing sections 12–22 which are formed by various regions of an assembly line that is not shown in detail in this figure, with the respectively required components or groups of components being made available and installed by workers in the individual sections 12–22.

According to the invention, a data collecting device 24 is assigned to each manufactured object, with said data collecting device being formed by a hand-held computer with a touchscreen 32 which is not shown in detail in the figure in this particular embodiment, and with said computer containing a transmission and reception unit that is formed by a radio transceiver.

The logic allocation of a certain data collecting device 24 to a certain automobile 10 is realized by inputting an identification number of the automobile into the data collecting device 24. This input may, for example, be realized with the aid of a keyboard or a scanner which scans a barcode that is arranged on the automobile 10 and represents the identification number. The scanner may be arranged separately from the data collecting device 24 in a separate device. The identification number is then transmitted to the respective data collecting device in a suitable fashion in order to assign a data collecting device 24 to the automobile. The spatial allocation of a data collecting device 24 to an automobile 10 is realized by providing a holding arrangement similar to a docking station, into which the data collecting device 24 can be deposited, on the automobile 10 or in its immediate vicinity.

In the embodiment shown in FIG. 1, a data collecting device 24 is assigned to the manufactured object (automobile 10) at the beginning of a first predetermined manufacturing section that is formed by the manufacturing section 16 in the embodiment shown. This data collecting device remains assigned to the automobile up to a second predetermined manufacturing section, in this embodiment, the manufacturing section 22, i.e., the data collecting device accompanies the automobile 10 while it passes through the manufacturing sections 16–22.

If a worker determines that a component or a group of components contains a defect, e.g., a functional defect or a defect that affects the optical appearance, or that a component or a group of components is missing, the respective worker enters corresponding data into the data collecting device 24 as described in detail below, namely with the aid of the touchscreen 32 of the data collecting device 24 assigned to the corresponding automobile 10. These data represent the presence of a defect on a component and/or the type and/or the location of a defect on the component and/or the location of a defect on the manufactured object and/or a missing component. The data input is described in greater detail below with reference to FIGS. 1 and 2. The data which were input in this fashion are transmitted to a central device 26 by the data collecting device 24 with a transmitter that is formed by a radio transmitter in this embodiment, with the central device receiving the data with a corresponding receiver. In this embodiment, a code for identifying the data collecting device 24 and the automobile 10, to which this data collecting device 24 is assigned, is transmitted together with the manufacturing-related data. In addition, data that contain a code for identifying the manufacturing section, in which these data were input, is transmitted. The data may also contain a code for identifying a worker who is active in this manufacturing section and/or a code for identifying a group of workers who are active in this manufacturing section.

The transmission of the data may take place immediately after their input. However, it may, for example, also take place when the respective automobile 10 departs from one of the manufacturing sections 16–22 and arrives in the ensuing manufacturing section.

Due to these measures, manufacturing-related data are available for each automobile located in the large-scale production in the central device. These manufacturing-related data make it possible to plan possibly required subsequent work at a time, at which the automobile in question is still located in the large-scale production, namely in one of the manufacturing sections 16–22. This significantly simplifies the planning of subsequent work and saves time.

Due to the fact that each data collecting device 24 is assigned to one automobile 10, the data collecting device passes through the manufacturing sections together with the automobile 10. Consequently, it is not required that the workers carry a data collecting device. The data collecting device may either be removed from the automobile 10 in order to input the data or even remain on the automobile. If so required, workers who always carry a data collecting device 24 may be provided in the large-scale production. In order to identify the automobile, the worker inputs the identification number assigned to the automobile before the data input begins.

The input of data into the data collecting device 24 is realized in a simple and rapid fashion.

The manufacturing-related data may be archived in the central device 26 in a program-controlled fashion. In addition, the data originating from different data collecting devices 24 and consequently from different manufactured objects may be evaluated in the central device 26, with defect data being generated after the evaluation which contains information on the presence of defects on components and/or groups of components used in the large-scale production. These defect data can then be transmitted from the central device to the manufacturing sections, in which the respective components and/or groups of components are manufactured and/or prepared and/or made available, e.g., the paint shop 14 or the press 12, in the form of a radio transmission. This makes it possible to take corresponding measures for eliminating the defects or supply shortages in the respective manufacturing sections.

The data remain available in the data collecting device 24 after their transmission. Consequently, it is possible for a worker to retrieve these data on the data collecting device at any time or to transmit these data to the central device anew, e.g., upon a corresponding request by the central device 26.

The data evaluated by the central device 26 may also be transmitted to the sections 28 and 30, in which the required subsequent work is planned and carried out.

FIG. 2 schematically shows a touchscreen 32 of the data collecting device 24, on which a menu 34 is illustrated.

In this embodiment, the menu 34 is controlled by determining with not-shown means in which manufacturing section 12–22 the automobile 10, to which the data collecting device 24 is assigned, is located. An individual menu 34 is then illustrated for each manufacturing section, with said menu only making available input options for the components or groups of components that are installed in this manufacturing section. This simplifies the data input and reduces the risk of input errors.

FIG. 2 shows an input menu for the manufacturing section 16 which contains fields arranged in the form of a matrix 36. In this case, the lines of the matrix are assigned to different components, e.g., the air filter, and the columns of the matrix are assigned to different types of defects. In the embodiment according to FIG. 2, twelve different types of defects are provided, with the defect type "1" indicating, for example, that the corresponding component is missing.

For example, if a worker determines in the manufacturing section 16 that the airbag is missing, the worker touches the field which is assigned to the component "airbag" and the defect type "1" (part missing) in the matrix 36 on a not-shown touchscreen 32. This field is symbolized by a black square 38 in FIG. 2. The corresponding data are then transmitted to the central device 26.

If so required, a selection menu 38 opens when touching one of the fields of the matrix 36. In FIG. 2, this is shown for the field 42 that is assigned to the component "air filter" and the defect type "8." The selection menu 38 may provide additional options, e.g., for identifying in detail the location of a defect on a component. The selection menu 38 may be structured such that the location of the defect on the component can be input by touching only one field of the selection menu 38 as symbolized in FIG. 2 by a cross 44.

Additional data may be displayed on the touchscreen 32, e.g., an identification number of the automobile and the input location, i.e., the manufacturing section, as shown in FIG. 2.

If it is required to identify the location of the defect in detail, e.g., with paint defects, a schematic representation 46 of the automobile 10 can be displayed on the touchscreen 32 as shown in FIG. 3. The location of paint defects can be identified by touching corresponding parts of the schematic representation 46 of the automobile 10. In this case, a selection menu may appear when touching the touchscreen 32 as described previously with reference to FIG. 2. The paint defect can be specified in even greater detail in this selection menu, e.g., with respect to the fact whether the paint defect pertains to a scratch or a dent.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. Method for providing manufacturing-related data in the production of manufactured objects, comprising:
   a) each manufactured object being assigned to a data collecting device which accompanies the manufactured object, the data collecting device being operable by a worker, and manufacturing-related data related to the manufactured object being input into the data collecting device by an input device arranged on the data collecting device;
   b) the manufacturing-related data being input into the data collecting device by a worker at least in a part of a manufacturing sections of the production of manufactured objects; and
   c) the data being transmitted at least partially from the respective data collecting device of each manufactured object to at least one central device during the production of manufactured objects.

2. Method according to claim 1, wherein:
   a) the data collecting device is assigned to the respective manufactured object at the beginning of a first predetermined manufacturing section, and the data collecting device remains assigned to the respective manufactured object up to a second predetermined manufacturing section.

3. Method according to claim 2, wherein:
   a) the first predetermined manufacturing section is, as viewed in the moving direction of the manufactured object through the manufacturing sections, located in one of the first manufacturing sections, and the second predetermined manufacturing section is located in one of the last manufacturing sections.

4. Method according to claim 1, wherein:
   a) a control is provided which determines the respective instantaneous position of the respective data collecting device and the respective manufactured object within the production of manufactured objects, and data which represent the respectively determined instantaneous position of the respective data collecting device and the respective manufactured object are at least occasionally transmitted to the central device.

5. Method according to claim 4, wherein:
   a) the control which determines the respective instantaneous position of the respective data collecting device and the respective manufactured object includes several reception devices spaced apart from one another within a region of the manufacturing sections, and the respective data collecting device at least occasionally transmits a log-on signal that is received by the different stationary reception devices in a chronologically successive fashion during the passage through the manufacturing sections, in such a way that the respective instantaneous position of each data collecting device and each manufactured object can be determined by ascertaining which of the stationary reception devices currently receives the log-on signal from the respective data collecting device.

6. Method according to claim 1, wherein:
   a) data which contain a code for identifying at least one of the manufactured object and the data collecting device, from which the data originate, are transmitted together with the manufacturing-related data or separately therefrom.

7. Method according to claim 1, wherein:
   a) the manufacturing-related data contain at least one of a code for identifying the manufacturing section, in which the data are input, and a code for identifying a worker who is active in the manufacturing section and a code for identifying a group of workers who are active in the manufacturing section.

8. Method according to claim 1, wherein:
   a) the data are transmitted from the data collecting device to the at least one central device by wire or by a wireless device.

9. Method according to claim 1, wherein:
   a) the data are transmitted during the passage through the manufacturing sections.

10. Method according to claim 1, wherein:
    a) the data are transmitted to the at least one central device immediately after their input into the data collecting device.

11. Method according to claim 1, wherein:
    a) the data which belong to one of a manufactured object and a manufacturing section are transmitted to the at least one central device in a chronological correlation to the departure of the respective manufactured object from the manufacturing section.

12. Method according to claim 1, wherein:
    a) the data are transmitted to the at least one central device upon request.

13. Method according to claim 1, wherein:
    a) a holding arrangement for the respective data collecting device is provided on one of the manufactured object and within the immediate vicinity of the manufactured object, and the transmission of the data begins once the data collecting device is deposited into the holding arrangement.

14. Method according to claim 1, wherein:
    a) the manufacturing-related data includes at least one of data which represent the presence of a defect on a component, a type of a defect on a component, a location of a defect on a component, a location of a defect on the manufactured object, and a missing component.

15. Method according to claim 1, wherein:
    a) that the data are input into the data collecting device by use of a keyboard or a keypad.

16. Method according to claim 1, wherein:
    a) the data are input into the data collecting device by use of a touchscreen.

17. Method according to claim 1, wherein:
    a) the data are input into the data collecting device by use of a scanner for scanning a bar code.

18. Method according to claim 1, wherein:
    a) a display device is provided for one of monitoring and controlling the data input into the data collecting device.

19. Method according to claim be 18, wherein:
    a) at least one screen menu is illustrated on the display device, and the data input is realized by selecting at least one element on the screen menu.

20. Method according to claim 18, wherein:
a) one individual screen menu is displayed on the display device in each manufacturing section, in accordance with the components used in each manufacturing section.

21. Method according to claim 1, wherein:
a) the data which originate from each manufactured object is evaluated in the central device, defect data which contain information on the presence of defects on components used in the production are generated after the evaluation, and the defect data are transmitted from the central device to the manufacturing section, in which the respective components are at least one of manufactured and made available.

22. Method according to claim 1, wherein:
a) an assembly line is used in the production of manufactured objects, and the different manufacturing sections are formed by regions of the assembly line which are arranged successively in the moving direction of the manufactured objects.

23. Method according to claim 1, wherein:
a) the data collecting devices include computer-assisted data collecting devices.

24. Method according to claim 1, wherein:
a) the production of manufactured objects includes large-scale production.

25. Method according to claim 1, wherein:
a) the production of manufactured objects includes automobile production.

26. Method according to claim 1, wherein:
a) the production of manufactured objects includes vehicle production.

27. Method for providing manufacturing-related data in the production of manufactured objects, comprising:

a) providing an object being manufactured;
b) assigning a data collecting device to the object being manufactured, the data collecting device accompanying the object being manufactured, and the data collecting device being operable by a worker during the production of the manufactured object;
c) inputting manufacturing-related data into the data collecting device by a worker, the inputting being performed in a manufacturing section of the production of the manufactured object;
d) providing at least one central device; and
e) transmitting the manufacturing-related data input into the data collecting device by a worker to the central device during the production of the manufactured object.

28. Method according to claim 27, wherein:
a) the data collecting device accompanies the manufactured object for only a part of the production of manufactured objects.

29. Method according to claim 27, wherein:
a) a substantially instantaneous position of the data collecting device and its respective manufactured object is determined at least during a part of the production of manufactured objects.

30. Method according to claim 27, wherein:
a) the data collecting device includes a hand-actuated data entry device operable by a worker.

31. Method according to claim 27, wherein:
a) the production of manufacturing objects includes manufacturing vehicles.

32. Method according to claim 27, wherein:
a) the vehicles include automobiles.

* * * * *